Feb. 24, 1959  W. A. RAY ET AL  2,874,930
VALVE-JET MOUNTING
Filed Nov. 9, 1954  2 Sheets-Sheet 1

INVENTORS,
WILLIAM A. RAY
BY LAURENCE C. BIGGLE

John H. Rouse,
ATTORNEY.

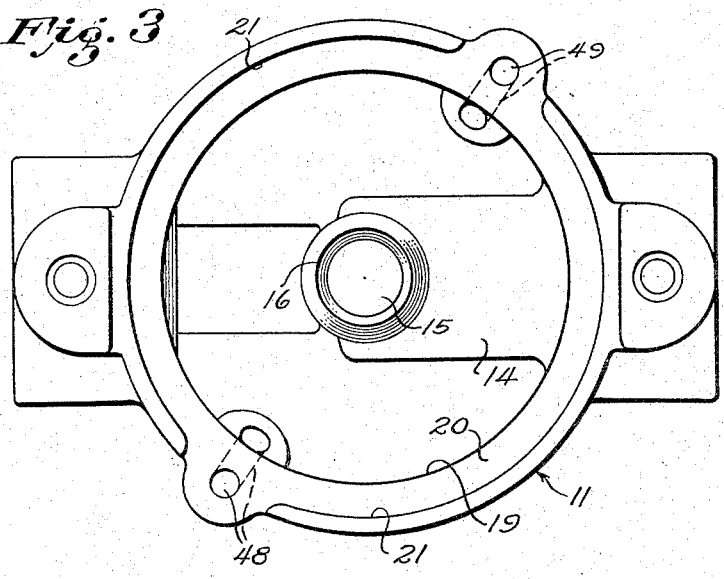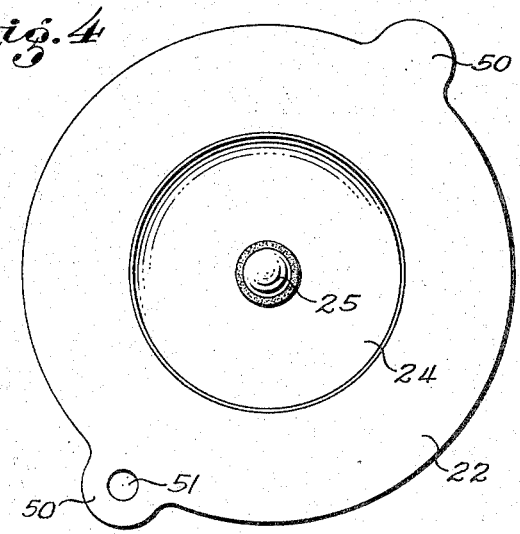

United States Patent Office 2,874,930
Patented Feb. 24, 1959

2,874,930

VALVE-JET MOUNTING

William A. Ray, North Hollywood, and Laurence C. Biggle, Altadena, Calif., assignors to General Controls Co., Glendale, Calif., a corporation of California Application November 9, 1954, Serial No. 467,777

7 Claims. (Cl. 251—211)

This invention relates to pilot-controlled diaphragm valves and more particularly to those of the type adapted for controlling supply of fuel gas to domestic heating and cooking apparatus and wherein the pilot valve comprises a pair of opposed jets and a rockable closure arm disposed between the jets for alternate seating engagement therewith.

In such diaphragm valves the closure arm is commonly in the form of an armature cooperating with an electromagnet energizable by electricity generated by a thermocouple or thermopile heated by a small flame of a pilot burner. Since the amount of electrical energy thus generated is minute, movement of the seating portion of the armature-closure arm between its alternate operative positions must be limited to a very small distance (usually less than 0.005 inch) and adjustment of the jets relative to the arm is quite critical.

When, as is usual, the pilot-valve jets are of the screw-threaded type, the slightest eccentricity of the threads may cause tilting of the jet-seat as the jets are adjusted, so that leakage occurs between the valve surfaces, which surfaces obviously must be of the metal-to-metal type when the operative movement of the closure arm is so minute. Further, when nuts are employed for locking the jets in position, the setting of the jet is altered as the locknut is tightened, even when the jet threads are as close-fitting as is practicable.

Adjustment of such jets within the minute range necessary for the proper operation of the pilot valve is therefore difficult and time-consuming. It is an object of this invention to facilitate adjustment of a pilot valve of the opposed-jet type and we accomplish this object, in general, by mounting the jets for sliding movement along their axes.

Another object of this invention is to provide an arrangement whereby, in assembly of a diaphragm valve, the desired amount of slack in the diaphragm is accurately and automatically set.

Another object is to provide a novel terminal construction for an enhoused electromagnetic operator whereby connection of a plurality of control devices is facilitated.

For full understanding of the invention, and further appreciation of its features and advantages, reference is to be had to the following detailed description and accompanying drawing, and to the appended claims.

In the drawing:

Figure 3 is a view from above of the valve casing 11 per se; and

Figure 4 is a plan of the diaphragm assembly 22—25.

Figure 1:
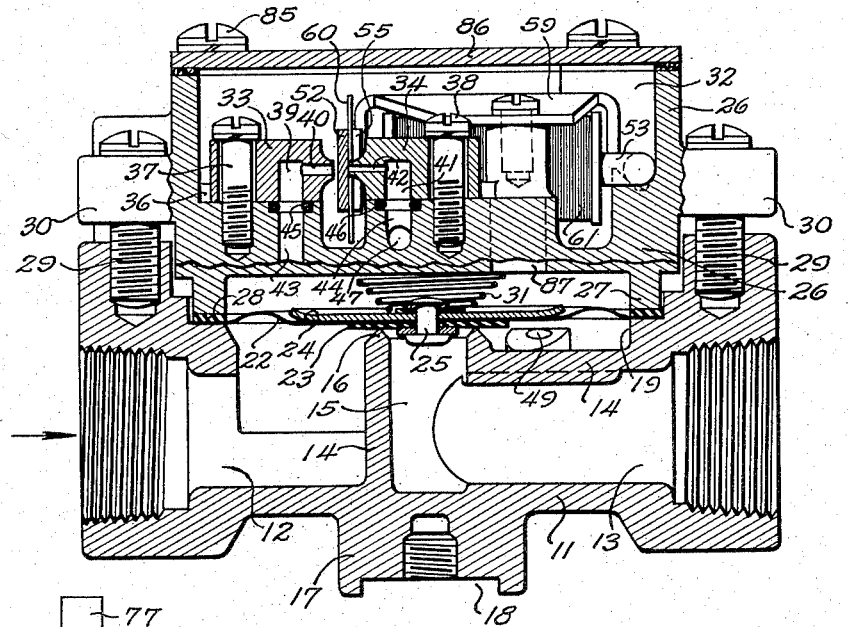
Figure 1 is a vertical sectional view of a pilot-controlled diaphragm valve embodying this invention, the upper and lower portions of the structure being cut in different planes, as is indicated generally by the line 1—1 in Fig. 2.

In the drawing, the numeral 11 indicates a valve casing having an inlet 12 and outlet 13 which are separated by an angled partition 14 having a port 15 and providing around the port a knife-edged valve seat 16. On the bottom of the casing is a boss 17 having in its underside a through slot 18 for receiving a mounting bracket (not shown).

At its top the casing 11 has a large circular opening defined by its side wall 19, this opening being enlarged to provide a horizontal shoulder 20 and a vertical side 21 around and above the shoulder, as is indicated in Fig. 3. Resting at its margin on the shoulder 20 is a diaphragm assembly (shown per se in Fig. 4) comprising a mainly-circular diaphragm 22, of thin rubber-like material, to the central part of which a closure disk 23 (cooperable with seat 16) and a stiffening plate 24 are secured by a rivet 25.

On top of the valve casing is a hollow structure 26 having on its underside a dependent annular portion 27 whose bottom surface bears on the margin of diaphragm 22 above shoulder 20, with a sealing gasket 28 therebetween. Structure 26 is secured to the valve casing by a pair of screws 29 passing through openings in ears 30 on the sides of the structure and threaded in openings in the casing. The only engagement of structure 26 with casing 11 is at the virtual junction of the annular portion 27 and shoulder 20. The diaphragm assembly is urged downwardly to seated position by the force of a conical spring 31 compressed between plate 24 and the underside of structure 26.

The diaphragm 22 is made slightly larger than the horizontal area defined by the side 21 around shoulder 20 so that the diaphragm is confined at its periphery by this side and the proper amount of slack in the central part of the diaphragm is uniformly and automatically established as the diaphragm is placed in position during assembly.

Mounted within a compartment 32 in the upper part of structure 26 is a pilot valve comprising a pair of aligned and faced jet members 33 and 34 which are rectangular in cross section and fit slidably in a guide slot defined by parallel spaced ribs 35 and 36 raised from the floor of compartment 32. The jet members are clamped to the flat bottom surface or seat of the guide slot by screws 37 and 38 passing through vertical openings in the rear portions of the members, these openings being oversize to permit lengthwise adjustment of the members.

In the underside of jet member 33, near its middle, is a short vertical passage 39 from which a horizontal branch passage 40 extends to the flat tip or seat of the member, the other jet member 34 having similar passages 41 and 42. The vertical passages 39 and 41 register, respectively, with openings 43 and 44 in the seat of the guide slot, an annular sealing member, such as a rubber O-ring, being provided at the junction of the passages and openings, as is indicated at 45 and 46. Branching from the lower end of opening 44 is a horizontal opening 47 which extends to the exterior of the structure 26 and thus to the atmosphere.

The other opening 43 is in register with an angled passage 48 in the valve casing which, as can be seen in Fig. 3, extends to the inlet chamber below diaphragm 22. A similar passage 49 in the casing is also provided at 180° to passage 48 to permit rotation of structure 26 through that angle relative to the casing before assembly if the electric terminals (to be described) of the pilot-valve operator would then be in a more convenient position. The diaphragm 22 (as well as gasket 28) has a pair of ears 50 coinciding with the top ends of passages 48 and 49; only one of these ears being apertured, as indicated at 51, as a precaution against leakage at the unused one of passages 48, 49.

Cooperating with the flat tips or seats of the pilot-valve jets 33, 34 is a closure arm 52 which, being of magnetic material, acts as the armature of an electromagnetic operator which comprises a U-shaped core 53 provided at its extremities with pole-pieces 54 and 55. Armature 52 has a low knife-edged fulcrum 56 bearing on the pole-piece 55 and is biased by the force of a spring 57 into seating engagement with jet 34, the spring 57 being in the form of a bent piece of wire bearing at one end in a dimple in the armature and secured at its other end, as by staking, in a notch cut in a portion 58 raised from its floor. This spring is in over-set condition as installed and is subsequently bent to produce the desired force.

The core 53 is supported closely adjacent its ends and at the middle of its cross-arm in V-notches provided in portions raised from the floor of structure 26 and is held down by a bent plate 59. Armature 52 is supported by a U-shaped piece 60 of thin resilient metal, the ends of the side arms of the strip being welded to the pole-piece 54, and the cross-arm of the strip to the armature adjacent the pilot-valve jets. The above-described arrangements for supporting the core and the armature are essentially the same as those fully disclosed in a copending application of William A. Ray, Serial No. 372,976 filed August 7, 1953, now Patent No. 2,850,685 granted September 2, 1958.

Around each of the side arms of core 53 is a coil 61, these coils being interconected in series and having leads 62 and 63. The lead 62 is grounded to the structure as indicated at 64, and the other lead 63 is soldered to the head of a screw or terminal-post 65 which projects through an opening in the side wall of structure 26 centrally of a cylindrical recess 66 formed at the outside of the wall. Screw 65 is insulated from the structure by a sleeve 67 and a U-shaped piece of fibre 68 between the screw head and a shallow recess therefor, the screw being fastened by a nut 69 and insulating washer 70.

Clamped to structure 26 around recess 66, by a nut 71 threaded on the outer end of screw 65, is a stack of terminal lugs or apertured plates, and insulating washers. One pair of terminal lugs 72 and 73, separated by an insulating washer 74 which is shouldered to center the lugs, is shown connected to a pair of wires 75, 76 which lead, by way of example, to a series arrangement of a thermostat 77 and a source of electric energy, here represented by a thermocouple 78. Another pair of lugs 79 and 80, separated by an insulating and centering washer 81, is shown connected by a pair of wires 82, 83 to an additional control device, such as a clock timer 84.

In the circuit arrangement described, when the contacts of thermostat 77 close, current generated by thermocouple 78 flows in the following path: from thermocouple 78 through wire 75, lug 72, ground, lead 62, coils 61, lead 63, screw 65, nut 71, lug 80, wire 83, timer 84, wire 82, lug 79, lug 73, wire 76 and thermostat 77 back to the thermocouple. If an additional control device such as timer 84 is not required in the circuit, lugs 79, 80 and washer 81 are removed and nut 71 replaced, the external circuit then comprising only the thermostat and thermocouple.

Fastened to the top of structure 26 by four screws 85 is a cover plate 86. The compartment 32 below this plate is in free communication with the space above diaphragm 22 by way of an opening 87 through the floor of structure 26.

Figure 2:
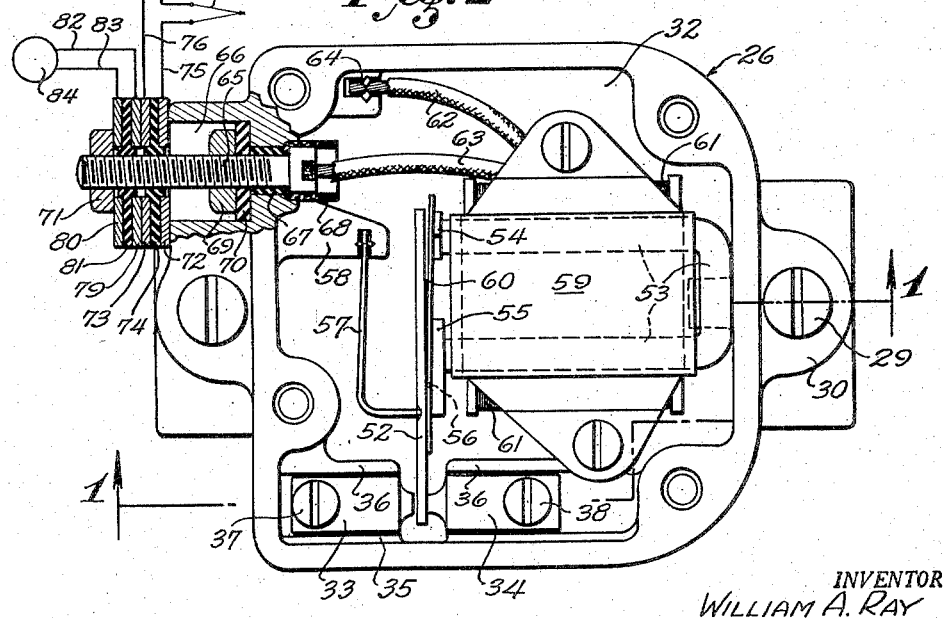
Figure 2 is a view from above of the structure of Fig. 1 with cover plate 86 removed, a portion of one corner being shown in section.

As shown in the drawing the diaphragm valve is closed. It is to be assumed that the inlet 12 of the valve is connected to a source of fluid, such as fuel gas, under pressure. The electromagnet 53, 61 is unenergized, the armature-closure 52 being in its biased position and vent jet 34 therefore closed. Jet 33 being open, the fluid pressure above and below the diaphragm is the same, so that the diaphragm assembly is held in seated position by the force of spring 31. When the electromagnet is energized armature-closure 52 is attracted and rocks clockwise (as viewed in Fig. 2) so that jet 33 is closed and vent jet 34 opened, the pressure of the fluid below the diaphragm then being effective to raise the diaphragm and unseat the main closure 23.

The electromagnetic pilot valve of this invention is adapted to be operated by a minute amount of electric energy, such as that produced by the thermoelectric generator disclosed in a copending application of Laurence C. Biggle, Serial No. 461,125 filed October 8, 1954, now Patent No. 2,792,440 granted May 14, 1957, and wherein the consumption of fuel gas is only about 1/10 cubic foot per hour. Operative movement of the armature-closure arm between the valve jets is then limited to a distance of less than 0.005 inch. The required fine adjustment of the jets relative to the armature, and of the armature relative to the attracting pole-piece, may be accomplished readily by the arrangement of our present invention in the following manner:

With screws 37, 38 loosened so that the jet members 33, 34 are free to slide, a shim of the desired thickness (0.003–0.004 inch) is placed between the armature and pole-piece 54, and manual pressure is applied to the armature to rock it into tight engagement with the shim. While holding the armature in its rocked position the jet 33 is slid into engagement with the armature and locked in that position. The shim is then removed from between the armature and pole-piece and placed between the armature and jet 34, which jet is then slid to the left to force the armature against jet 33, and is locked in position. The adjusting operation is complete when the shim is then removed and the spring 57 bent to produce the desired amount of force.

Usually, the same shim may be employed in the adjustment of both jets; the clearance or air-gap between the pole-piece and armature, when the same is attracted, then being approximately the same as the space between the jets and the armature when the same is in either of its operative positions. The guide ribs 35, 36 are arranged so that there is only sufficient clearance between them and the jets to permit slight angling of the jets which may be necessary for accurate seating of the armature-closure.

The specific embodiment of our invention herein shown and described is susceptible of modification without departing from the spirit of the invention, and we intend therefore to be limited only by the scope of the appended claims.

We claim as our invention:

1. In a pilot valve: a base; an elongated jet member; said base having means defining a slot for guidingly receiving said jet member and wherein the jet member is adjustably slidable lengthwise; the bottom surface of said slot providing a seat for the jet member and having an opening therein; means for clamping the jet member to said seat; the jet member having a passage communicating with said opening and extending to one end of the jet member; the jet member having at said one end a valve seat around said passage; and a closure arm rockably mounted on said base and having a portion engageable with said valve seat.

2. In a pilot valve: a base; an elongated jet member generally rectangular in cross section; said base having means defining a slot for guidingly receiving said jet member and wherein the jet member is adjustably slidable lengthwise; the bottom surface of said slot providing a plane seat for the jet member; means for clamping the jet member to said seat; the jet member having a passage extending at one of its ends to said seat and at its other end to one end of the jet member; said seat having an opening therein in register with said one end of said passage; a sealing ring around the junction of said passage and said opening; the jet member having at said one of its ends a valve seat around said passage; and a closure arm rockably mounted on said base and having a portion engageable with said valve seat to control flow through said passage and opening.

3. A pilot valve according to claim 2, including means limiting said rocking movement to a path of movement in a plane parallel to the plane of said slot-seat.

4. In a three-way pilot valve: a pair of elongated valve-jet members each having a valve seat at one of its ends; a base; means for mounting said jet members on a surface of said base so that the jet members are interaligned and with their valve seats facing each other and spaced apart, said mounting means including means providing each of said jet members with adjustable sliding engagement lengthwise on said base-surface; and a closure arm, having a portion extending between said valve seats for alternate engagement therewith, mounted on said base for rocking movement in a plane parallel to the plane of said base-surface.

5. In a three-way pilot valve: a pair of elongated valve-jet members each having a valve seat at one of its ends; a base having means defining a slot for receiving said jet members in interalignment and with their valve seats facing each other and spaced apart, means for mounting each of said jet members for adjustable sliding engagement in said slot, the bottom surface of said slot providing a seat for each of the jet members; means for clamping the jet members to said slot-seats; and a closure arm rockably mounted on said base and having a portion extending between said valve seats for alternate engagement therewith.

6. In a three-way pilot valve: a pair of elongated valve-jet members each having a valve seat at one of its ends; a base having means defining a slot for receiving said jet members in interalignment and with their valve seats facing each other and spaced apart, means for mounting each of said jet members for adjustable sliding engagement in said slot, the bottom surface of said slot providing a seat for each of the jet members; means for clamping the jet members to said slot-seats; each of the jet members having a passage one end of which extends to the respective ones of said slot-seats, the other ends of the passages extending to the respective ones of said valve seats; said slot-seats each having an opening therein in register with the respective one-ends of said passages; and a closure arm, having a portion extending between said valve seats for alternate engagement with the same, mounted on said base for rocking movement in a plane parallel to that of said slot-seats.

7. A pilot valve according to claim 6 and including a sealing ring around the junction of each of said passages and slot-seat openings.

References Cited in the file of this patent

UNITED STATES PATENTS

| | | |
|---|---|---|
| 648,593 | Metzger | May 1, 1900 |
| 1,549,072 | Dole | Aug. 11, 1925 |
| 1,571,638 | Olson | Feb. 2, 1926 |
| 2,232,970 | Ray | Feb. 25, 1941 |
| 2,267,515 | Wilcox | Dec. 23, 1941 |
| 2,349,209 | Taylor | May 16, 1944 |
| 2,470,037 | Liddle | May 10, 1949 |
| 2,672,150 | Benedict | Mar. 16, 1954 |
| 2,767,689 | Moog | Oct. 23, 1956 |
| 2,775,254 | Stanbury | Dec. 25, 1956 |